United States Patent
Kretschmer

(10) Patent No.: US 6,470,671 B1
(45) Date of Patent: Oct. 29, 2002

(54) COOLABLE NOZZLE AND METHOD FOR PRODUCING SUCH A NOZZLE FOR A ROCKET ENGINE

(75) Inventor: Joachim Kretschmer, Feldafing (DE)

(73) Assignee: Astruim GmbH, Munich (DE)

( * ) Notice: Subject to any disclaimer, the term of this patent is extended or adjusted under 35 U.S.C. 154(b) by 0 days.

(21) Appl. No.: 09/539,043

(22) Filed: Mar. 30, 2000

(30) Foreign Application Priority Data

Apr. 1, 1999 (DE) .......................................... 199 15 082

(51) Int. Cl.$^7$ ................................................ F02K 9/64
(52) U.S. Cl. ..................................... 60/267; 239/127.1
(58) Field of Search .......................... 60/267, 271, 770; 239/127.1

(56) References Cited

U.S. PATENT DOCUMENTS

| | | | | |
|---|---|---|---|---|
| 2,880,577 A | * | 4/1959 | Halford et al. .......... | 239/127.1 |
| 3,099,909 A | * | 8/1963 | Newcomb ................ | 239/127.1 |
| 3,170,286 A | | 2/1965 | Stein .......................... | 60/267 |
| 3,190,070 A | * | 6/1965 | Neu ............................ | 60/267 |
| 3,224,678 A | * | 12/1965 | Rosman ...................... | 239/127.1 |
| 3,241,311 A | * | 3/1966 | Kuhrt ......................... | 60/267 |
| 3,267,664 A | * | 8/1966 | Jones et al. ................. | 60/267 |
| 3,289,943 A | * | 12/1966 | Thomas et al. .......... | 239/127.1 |
| 3,349,464 A | * | 10/1967 | Becker, Jr. et al. ...... | 239/127.1 |
| 3,460,759 A | * | 8/1969 | Gregory et al. .......... | 239/127.1 |
| 3,692,637 A | * | 9/1972 | Dederra et al. ............ | 60/267 |
| 4,148,121 A | * | 4/1979 | Butter et al. | |
| 5,221,045 A | * | 6/1993 | McAninch et al. ...... | 239/127.1 |
| 5,532,452 A | * | 7/1996 | Lechner et al. | |

FOREIGN PATENT DOCUMENTS

| | | | |
|---|---|---|---|
| DE | 2462131 | * | 2/1976 |
| DE | 2743838 | | 3/1978 |
| DE | 3119712 | | 3/1982 |
| DE | 3942022 | | 6/1991 |
| DE | 4301041 | * | 4/1994 |
| DE | 4326338 | | 2/1995 |
| DE | 19520885 | | 5/1996 |
| DE | 19716524 | | 8/1998 |

* cited by examiner

*Primary Examiner*—Michael Koczo
(74) *Attorney, Agent, or Firm*—W. F. Fasse; W. G. Fasse

(57) ABSTRACT

A regeneratively coolable nozzle for a rocket engine is formed by winding a tubular material (6) onto a winding mandrel to produce a helical composite structure (5), through which a coolant can flow during operation of the nozzle. The spiral composite structure (5) is fixed temporarily and the fixed composite structure (5) is removed from the winding mandrel. Then an inner heat resistant, load bearing layer (9) is applied to the radially inner hot-gas facing surface (H) of the fixed composite structure (5). The present nozzle is lightweight and withstand a high coolant pressure.

6 Claims, 3 Drawing Sheets

COMPOSITE STRUCTURE, PLASTICALLY DEFORMED AFTER EXPOSURE TO PRESSURE

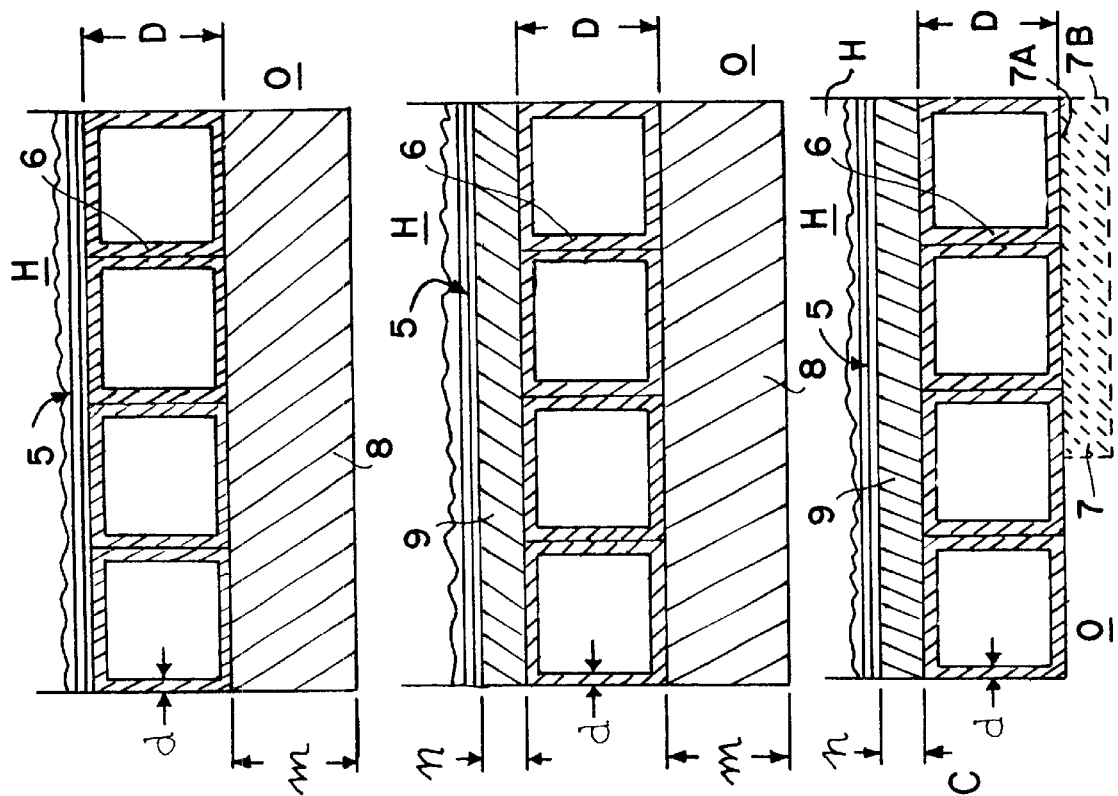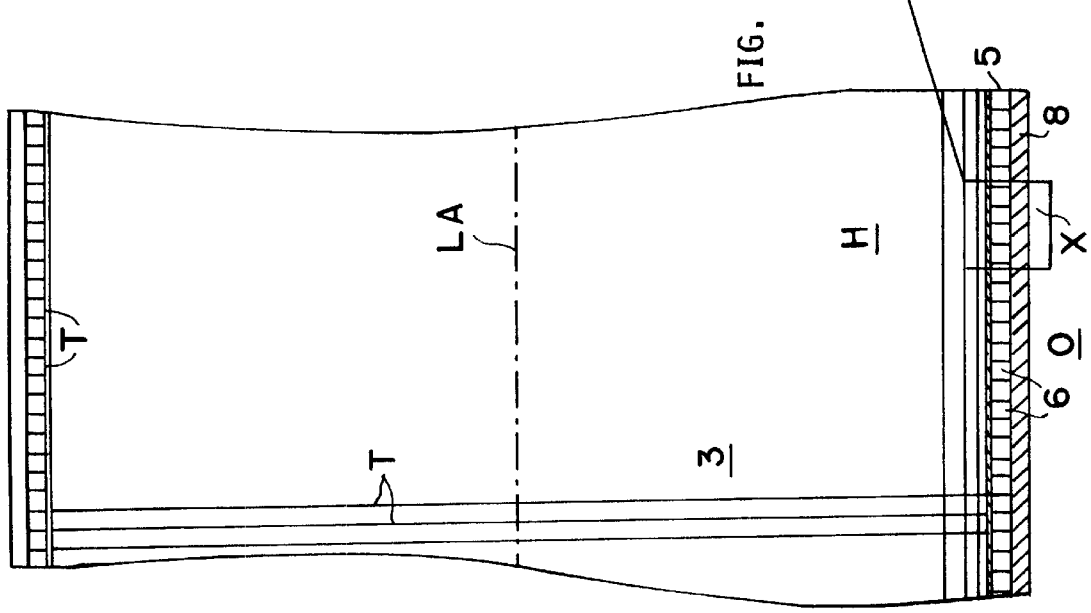

COOLABLE NOZZLE AND METHOD FOR PRODUCING SUCH A NOZZLE FOR A ROCKET ENGINE

PRIORITY CLAIM

This application is based on and claims the priority under 35 U.S.C. §119 of German Patent Application 199 15 082.6 filed on Apr. 1, 1999, the entire disclosure of which is incorporated herein by reference.

FIELD OF THE INVENTION

The invention relates to a nozzle and a method for producing a nozzle for a rocket engine, whereby the nozzle is produced in such a way that it can be regeneratively cooled by means of a coolant flowing through tubular passages in the nozzle wall.

BACKGROUND OF THE INVENTION

Nozzles of rocket engines are parts which are subjected to extreme thermal loads calling for special measures to assure their stability during operation of the rocket engine. One option for such a measure involves regenerative cooling of the nozzle by means of a coolant which is conducted through the nozzle body under pressure. In the case of liquid propellant rockets a possible coolant is one of the fuel components. Thus for example in a rocket engine which uses hydrogen as a fuel, prior to supplying the hydrogen to the combustion chamber, it may be conducted through the nozzle body to cool the nozzle. In a rocket engine naturally the saving of any additional weight is of considerable importance. Therefore, it is a particular aim to produce a regeneratively cooled nozzle so that it combines high strength with a light weight.

German Patent Publication DE 43 26 338 C2 discloses nozzles for rocket engines, which nozzles are regeneratively cooled by a flowing coolant. The known nozzle body is produced by winding a tubular material onto a winding mandrel. Coolant can flow through the tubular material during operation of the nozzle. The wound tubular material forms a helical structure or body in which the individual turns are stabilized by welding the turns together on the "cold" or exterior side of the wound helical body. A tubular material of rectangular cross-section is used so that the surface of the interior of the spiral composite structure forming the nozzle body is essentially smooth. The welding operation leaves room for improvement because very long welding seams are required and damage to the tubular cross-sectional flow area may occur.

German Patent Publication DE 39 42 022 C2 (Herzog et al.) discloses a cooling system for turbo-jet engines. Coolant flows through channels in engine component walls. Boundary layer air is liquified and vaporized for use as the coolant.

German Patent Publication DE 197 16 524 C1 (Huber et al.) discloses an aluminum alloy and a magnesium alloy that is water soluble and can be used, for example, for the present fixing layer to be described below.

German Patent Publication DE 195 20 885 C2 (Voggenreiter et al.) discloses a method for thermal spraying of a load bearing heat resistant layer. Such spraying method and the materials disclosed by Voggenreiter et al. are useful for the present purposes.

German Patent Publication DE 27 43 838 (Farfaglia) is based on U.S. Ser. No. 727,910 filed in the U.S. on Sep. 29, 1976, now U.S. Pat. No. 4,131,057 which discloses an apparatus for winding tubular material onto a mandrel for producing a tubular wall of a container.

German Patent Publication DE 31 19 712 C2 (Donguy) discloses a connector for securing components of a solid fuel rocket engine to each other.

OBJECTS OF THE INVENTION

In view of the above it is the aim of the invention to achieve the following objects singly or in combination:

- to construct the nozzle body in such a way that it has a reduced weight compared to conventional nozzle bodies of this type and size while simultaneously having an improved strength, to withstand a high pressure of a cooling medium flowing through the nozzle body in operation;
- to improve the heat resistance of a regeneratively cooled nozzle while simultaneously forming a smooth radially inwardly facing nozzle surface contacted by the combustion flow in operation;
- to avoid time and extra material consuming efforts such as welding operations in the nozzle production;
- to provide the nozzle body on its interior with a heat resistant, load supporting layer;
- to provide the nozzle body, especially at its ends, with reinforced areas for flanging the nozzle body to a compensation chamber or the like;
- to disclose an improved method for producing a nozzle for a rocket engine, whereby the nozzle shall be regeneratively coolable by a coolant flowing through the nozzle body; and
- to provide a regeneratively coolable nozzle for a rocket engine, said nozzle comprising the above outlined improved characteristics.

SUMMARY OF THE INVENTION

According to the invention, a method for producing a regeneratively coolable nozzle or nozzle body for a rocket engine, comprises the following steps:

- winding tubular material onto a winding spindle or mandrel in the form of a helical composite nozzle body structure, whereby the tubular material is capable of having a coolant flown therethrough during operation of the nozzle;
- fixing the spiral composite nozzle body structure to retain its helical nozzle body structure at least temporarily;
- removing the fixed composite structure from the winding spindle or mandrel; and
- applying a heat resistant load bearing layer to the radially inwardly facing surface of the fixed composite nozzle body structure forming the hot-gas side of the nozzle body.

The method according to the invention provides a significant advantage in that the nozzle so produced, while being very lightweight, withstands a high coolant pressure which may be within the range of about 200 to 250 bar. Moreover, the material heat resistant load bearing layer has a smooth surface facing the hot-gas flowing through the nozzle body, whereby the flow characteristics are improved.

It is advantageous if application of the heat resistant load bearing layer is by a spraying method.

It is particularly advantageous if the application of the heat resistant, load bearing layer takes place by flame spraying such as a high velocity oxygen fuel (HVOF) method. The high velocity oxygen fuel method provides the advantage of making it possible to produce stable load bearing layers having a low porosity and a low oxygen content.

Alternatively, application of the load bearing layer can take place by vacuum plasma spraying or by cold-gas spraying.

According to a particularly advantageous embodiment of the method according to the invention, fixing of the individual turns of the tubular material in the shape of the helical composite nozzle body structure takes place after winding the tubular material turns onto a mandrel. A removable external fixation layer is applied to the exterior of the spiral composite nozzle body structure, whereby the turns of the tubular material are temporarily held in place in a simple way without any time consuming, expensive or material-weakening measures such as welding together the tubular material turns. After the internal heat resistant load bearing layer has been applied and set, the external fixation layer is removed.

Advantageously, the fixation layer is formed by spray application of the layer material, such as a water-soluble alloy, whereby AQUALLOY is of particular advantage due to its easy removability.

As alternatives, the external, temporary fixation layer can be formed of a gypsum material, a low-melting metal, or a low-melting metal alloy. These materials are also easily removed.

If the fixation layer is removed after producing the load bearing layer it is assured that the turns of the tubular material will retain their position within the nozzle body since those turns are now held in place by the heat resistant, load bearing layer.

Preferably, a finishing operation is applied to the load bearing layer to increase the smoothness of the radially inwardly facing surface of the load bearing layer. In this way the surface of the hot-gas wall, which after application is already quite smooth, can further be improved in its surface finish for assuring an improved flow of the hot gases through the nozzle.

According to a development of the method according to the invention, a further heat resistant, load bearing layer is applied in the area of the ends on the outside of the spiral composite nozzle body structure to create connecting flange areas which provide the advantage of flange-mounting the nozzle body to the combustion chamber structure or of flanging propulsion plant components to the nozzle body in a simple and economical way. Preferably, this further load bearing layer is applied after removal of the fixation layer.

According to a development of the method according to the invention, the production of the load bearing layer or layers is followed by an annealing treatment of the spiral composite structure.

Preferably, the tubular material used for winding the spiral composite structure is of rectangular cross-section, in particular of square cross-section with outer surfaces that preferably bulge radially outwardly. This feature is produced by pressurizing the helical composite nozzle body structure by introducing a medium at high pressure within the range of about 300 to 350 bar into the tubular material for bulging outer walls of the tubular material radially outwardly. In this way the tubular material assumes a shape in which it will be able to withstand high operational pressures without any further plastic deformation. Incidentally, the bulging operation is performed after the wound body of tubular material has been annealed.

The nozzle body according to the invention is characterized by a helically wound structure of a tubular material which is reinforced by a radially inwardly facing heat resistant load bearing layer, preferably made of special, high grade steel, nickel chromium alloys such as Inconell 800® or other materials known to withstand loads under high temperature conditions prevailing in an operating rocket engine. This heat resistant load bearing layer is smooth on the inwardly facing surface for improved flow conditions.

Further load bearing layers outwardly applied to at least one outer end surface area of the nozzle body provide flanging areas in a simple and economical way for connection to the combustion chamber or to other components of the rocket engine.

BRIEF DESCRIPTION OF THE DRAWINGS

In order that the invention may be clearly understood, it will now be described in connection with example embodiments, with reference to the accompanying drawings, wherein:

FIG. 2 is a sectional view of part of the nozzle body showing the nozzle wall construction in section prior to the application of a heat resistant, load bearing internal layer;

FIGS. 3A to 3c are enlarged views of section A in FIG. 2, to illustrate a method for producing a nozzle for a rocket engine according to one embodiment of the invention; and FIGS. 4A and 4B are further enlarged sectional views showing a cross-section through a tubular material which according to one embodiment of the invention can be used for the production of the present nozzle body, wherein FIG. 4B shows the section after a bulging step has been performed.

DETAILED DESCRIPTION OF PREFERRED EXAMPLE EMBODIMENTS AND OF THE BEST MODE OF THE INVENTION

Figure 1:
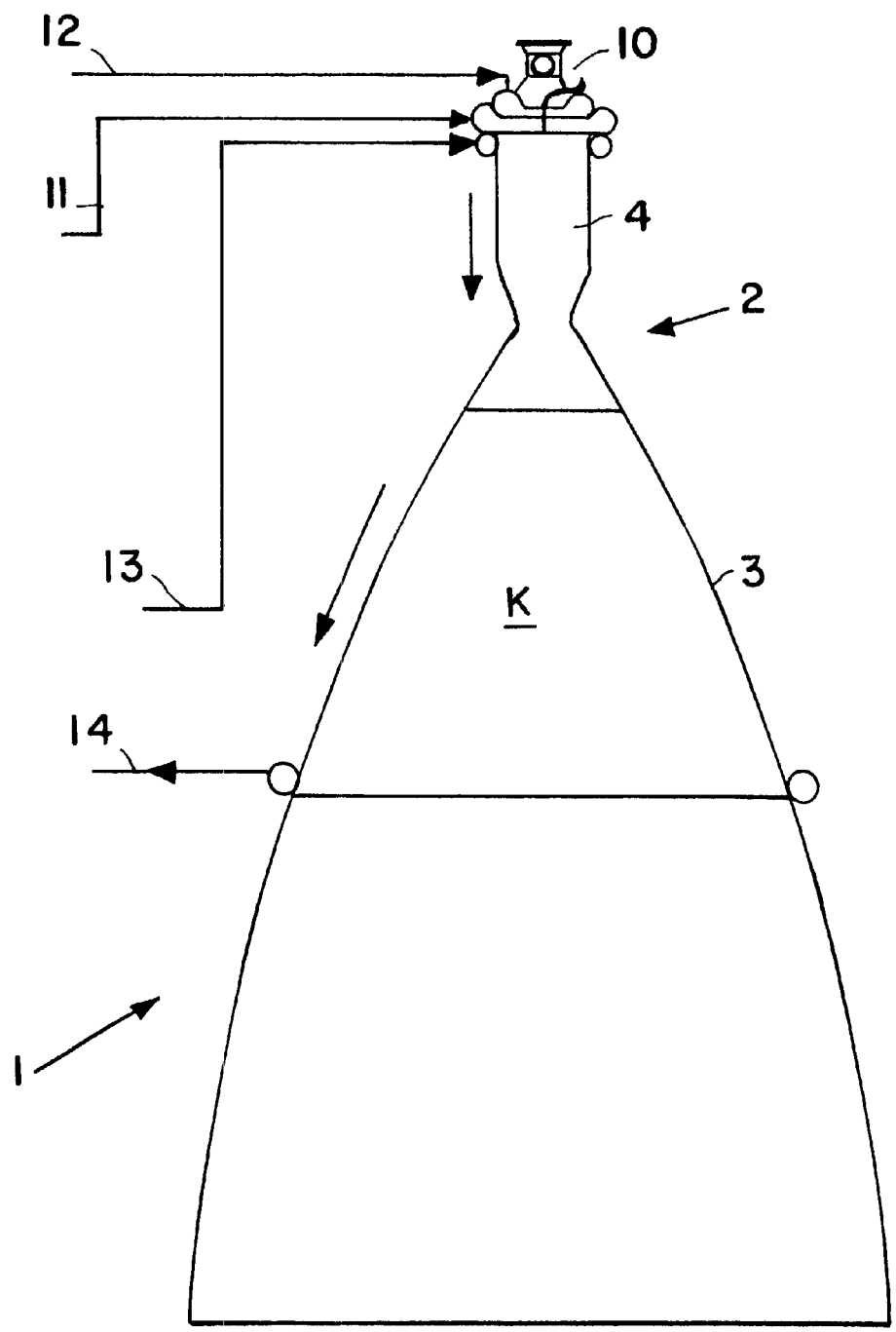
FIG. 1 is a lateral diagrammatic view of a nozzle body for a rocket engine according to one embodiment of the invention.

FIG. 1 shows schematically a rocket engine with a nozzle 2 according to the invention. The nozzle 2 includes a nozzle body 3 connected to one end of the nozzle 2 while the opposite nozzle end is connected to a combustion chamber 4. A fuel mixing system 10 is positioned for feeding mixed fuel into the combustion chamber 4. Fuel is supplied to the mixing system 10 by a fuel inlet 11 and an oxidant supply line 12. The fuel may, for example, be liquid hydrogen; the oxidant may, for example be liquid oxygen. Furthermore, a coolant inlet 13 and a coolant outlet 14 are provided. At least a portion K of the nozzle body 3 is regeneratively coolable by a coolant which is fed into an inlet 13 and let out through the coolant outlet 14. It is possible, for example, to use the liquid fuel provided for operating the rocket engine as a coolant with the help of a correspondingly powerful pump, not shown in FIG. 1, for generating a high pressure and a high flow rate. The liquid fuel is supplied to the coolant inlet 13 to the coolable portion K of the nozzle body 3 and the fuel outlet 14 may then be directly connected to the fuel inlet 11 of the engine.

FIG. 2 shows a section through the coolable portion K of the nozzle body 3 of the nozzle 2. For simplification, the walls of the nozzle body 3 are shown as part of a cylindrical body having a central longitudinal axis LA extending vertically in the drawing. The nozzle body 3 comprises a helical composite structure 5 produced by winding turns T of a tubular material 6 having a rectangular or square cross-section preferably with rounded corners as shown in FIGS.

4A and 4B. The helical composite structure 5 is made by winding the tubular material 6 onto a winding spindle or mandrel not shown to form a helix.

The tubular material is preferably made of nickel alloys such as Inconell 600®. Further, materials suitable for spraying the heat resistant load bearing layer may also be suitable for making the tubular material for winding the tubular body.

FIGS. 3A, 3B and 3C show on an enlarged scale a section of the partial area X in FIG. 2 for illustrating respective production steps according to one embodiment of the invention. The letter H designates the hot radially inner space of the nozzle body 3. The letter O designates an area radially outside of the nozzle body 3.

As shown in FIG. 3A, the helical composite structure 5 is formed by a tubular material 6, for example, of square cross-section, with the tubes 6 comprising a radial length or width D and a wall thickness d. After winding the helical composite structure 5, it is fixed by applying a removable fixation layer 8 on the exterior side O of the helical composite structure 5. The fixation layer 8 can be several millimeters in thickness m. The fixation layer 8 is formed by spraying on a layer material that will set sufficiently to temporarily hold the turns T of the helix together. In the present embodiment the fixation layer 8 comprises a water-soluble alloy known as AQUALLOY. As a result of the application of the fixing layer 8 the helical composite structure 5 is sufficiently fixed to allow its removal as an integral part, from the winding spindle or mandrel.

After removal of the fixed composite structure 5 from the winding spindle, the interior H of the helical composite structure 5 which will form the interior hot-gas side of the nozzle body 3, is exposed. As shown in FIG. 3B, a heat resistant load bearing layer 9 is then applied to the surface of the fixed helical composite structure 5. The radially inner surface of the layer 9 will face the hot-gas passing through the nozzle body 3. The thickness n of the load bearing layer 9 typically exceeds the wall thickness d of the tubular material 6.

Application of the load bearing layer 9 preferably takes place by a spraying method; in particular thermal spraying by means of a high-velocity oxygen fuel method is recommended. The high-velocity oxygen fuel (HVOF) method makes it possible to produce metal layers with a low porosity and with a low oxide content, by thermal spraying. With suitable process control, such layers can be produced as stable load bearing layers. Preferably, the applicant's "Method for Thermal Spraying of Layers Made of Metal Alloys or Metals and Its Use" described in DE 195 20 885 C1 is used as a high-velocity oxygen fuel method. According to this method, metallic layers of low porosity, typically less than 1 vol. % and of little oxide content, typically less than 1 wt % can be produced by carrying out thermal spraying such that during impact with the substrate, at least 60, preferably 90 wt. % of the particles of the spray powder are at a temperature between the solidus temperature and the liquidus temperature of the metal or of the metal alloy. For further details of the method used, consult the contents of the above-mentioned patent which is expressly incorporated in the present application by reference.

FIG. 3B shows both the inner layer 9 and the outer fixation layer 8. After completion of the load bearing layer 9, the fixation layer 5 is removed from the helical composite structure 5 so that now, as shown in FIG. 3C, the inside of the helical composite structure S carries the load bearing layer 9 and is stabilized by said load bearing layer 9.

FIG. 3C further shows by dashed lines and stippling, a further heat resistant, load bearing layer 7 similar to the load bearing layer 9, applied directly on an outer radially facing end surface area 7A of at least one end on the outside O of the helical composite structure 5. The layer or layers 7 provide a nozzle body end surface that is a flange mounting 7B facing axially and having a sufficient radial thickness for flanging the nozzle body 3 to the combustion chamber 4 or for flanging other power plant components to the nozzle body 3. As is shown, such a further load bearing layer 7 is applied to the respective area on the outside O of the helical composite structure 5 after the fixation layer 8 has been removed. Therefore, the load bearing layer 7 is positioned radially outwardly of the helical composite structure 5 and the axially facing, radially extending flange mounting 7B is also positioned radially outwardly of the tubular material that forms the helical composite structure 5.

After application of the load bearing layer 9, a smoothing operation is preferably applied to the radially inwardly facing surface of the layer 9 to further increase the smoothness of the surface of the load bearing layer 9. Actually, this radially inner surface of the layer 9 is quite smooth as a result of the spraying. However, a smoothing operation such as fine grinding or buffing or honing will further improve the flow characteristic of the inner nozzle surface. Furthermore, after producing the load bearing layer 9 or 9 and 7, an annealing process of the spiral composite structure 5 can be performed so as to cause an increase in quality of the material. The annealing temperature and duration will depend on the material 6. Such information is normally provided by the manufacturer of the tubular material and of the material for the layers 7 and 9. Such materials have been mentioned above.

Figure 4A:
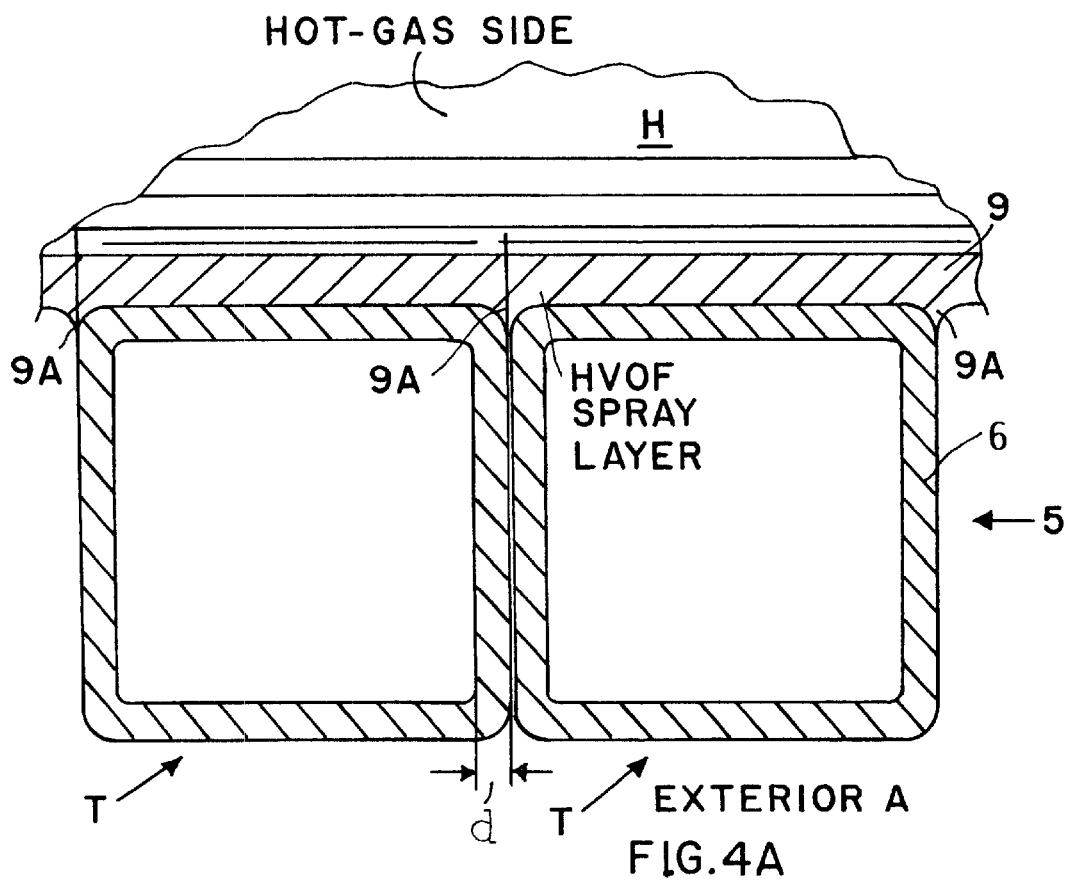
Figure 4B:
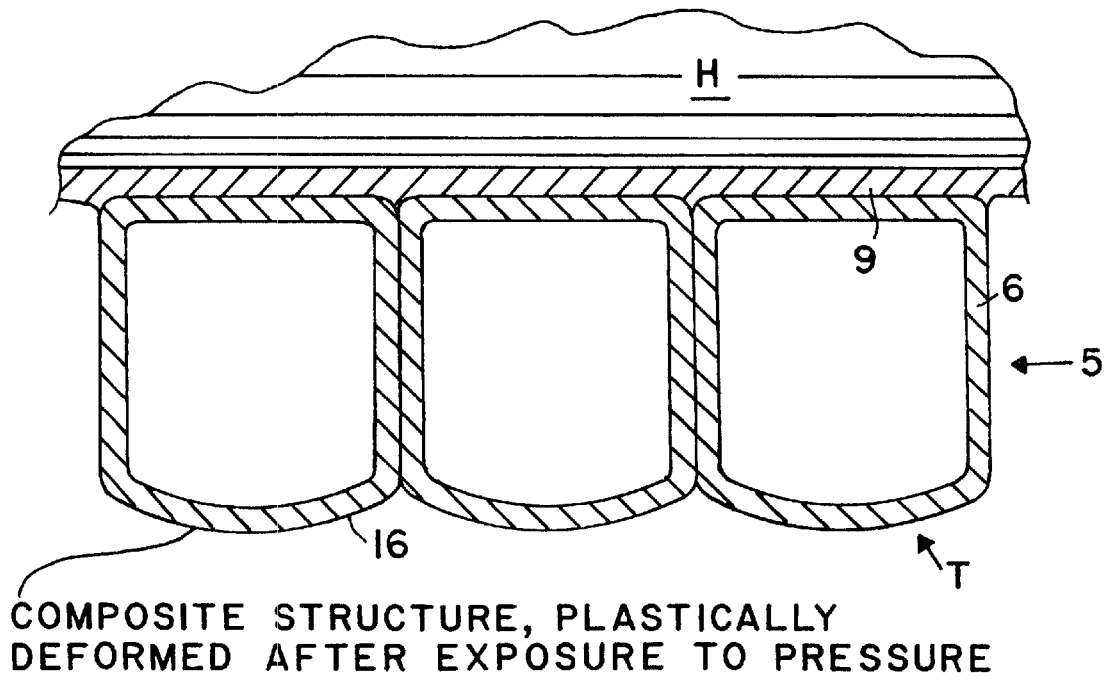

FIGS. 4A and 4B drawn to different scales, show sectional views of the helical composite structure 5 of the nozzle body 3. As shown in FIG. 4A the load bearing layer 9 has been applied on the hot-gas inner side H of the helical composite structure 5, whereby layer material 9A enters into or fills grooves formed between rounded corners of neighboring turns T to improve the bonding between turns T.

After producing the load bearing layer 91 pressing-off of the spiral composite structure 5 is performed by introducing a medium at high pressure within the range of about 300 to 350 bar into the tubular material 6, for forming bulges 16 of the profile of the tubular material 6 on the exterior A of the helical composite structure 5, as shown in FIG. 4B. In this way the tubular material 6 assumes a shape in which during later operation of the rocket engine, it will be able to withstand the high pressure exerted by the coolant flowing through the tubular material 6, without any further plastic deformation in response to operational cooling pressures within the range of about 200 to 250 bar.

As Fan alternative to producing the fixation layer 8 for temporarily stabilizing the spiral composite structure 5, of a water-soluble alloy, the fixation layer 8 can also be formed of a gypsum material or a low-melting metal or a low-melting metal alloy, so that the fixation layer 8 is easily removable after application of the load bearing layer 9. Materials for the layer 8 are for example AQUALLOY and gypsum as mentioned above, and aluminum-tin-zinc alloys.

Furthermore, instead of producing the load bearing layer 9 by thermal spraying, this layer can also be produced by vacuum plasma spraying or by cold-gas spraying. Materials for this purpose are for example the above mentioned Inconell 800®, or high grade steels which are also suitable for the outer layer 7 for forming a flange.

The invention produces a nozzle for a rocket engine, said nozzle being regeneratively coolable by means of a coolant flowing through the tubular material 6.

The spiral composite structure 5 comprises a tubular material 6 of rectangular cross-section, in particular square cross-section. Examples for tubular materials are given above.

On the exterior of the spiral composite structure, the profile of the tubular material 6 preferably comprises a bulge in each turn T.

Although the invention has been described with reference to specific example embodiments, it will be appreciated that it is intended to cover all modifications and equivalents within the scope of the appended claims. It should also be understood that the present disclosure includes all possible combinations of any individual features recited in any of the appended claims.

What is claimed is:

1. A regeneratively coolable nozzle for a rocket engine, comprising a nozzle body (3) including a wound helical structure (5) of tubular material (6) forming turns (T) for flowing a coolant through said turns of said tubular material, said helical structure (5) having an axially facing end surface of tubular material, and an internal load bearing layer (9) applied to a radially inwardly facing surface of said wound helical structure (5) and capable of withstanding heat prevailing in said rocket engine, said internal load bearing layer (9) forming a radially inwardly facing hot-gas side (H) of said nozzle body (3), said nozzle body (3) further comprising at least one external load bearing layer (7) positioned at least on one outer radially facing end surface area (7A) of said nozzle body (3), radially outwardly of said wound helical structure (5) said external load bearing layer (7) of said nozzle body (3) further comprising an axially facing, radially extending flange-mounting (7B) positioned radially outwardly of said axially facing end surface of said tubular material.

2. The nozzle of claim 1, wherein said tubular material (6) has a rectangular or square cross-section.

3. The nozzle of claim 1, further comprising radially outwardly facing bulges (16) of said tubular material (6).

4. The nozzle of claim 1, wherein said radially inwardly facing hot-gas side (H) of said internal load bearing layer (9) has a smooth surface for contact by hot gases.

5. The nozzle of claim 1, comprising grooves facing inwardly between said turns (T), and wherein said internal load bearing layer (9) fills said grooves to provide an improved bonding between said turns (T).

6. The nozzle of claim 5, wherein said turns (T) comprise inwardly facing rounded corners forming said grooves.

\* \* \* \* \*

UNITED STATES PATENT AND TRADEMARK OFFICE
CERTIFICATE OF CORRECTION

PATENT NO. : 6,470,671 B1
DATED : October 29, 2002
INVENTOR(S) : Kretschmer

It is certified that error appears in the above-identified patent and that said Letters Patent is hereby corrected as shown below:

Title page,
Item [73], Assignee, replace "Astruim" by -- Astrium --;
Item [57], ABSTRACT,
Line 10, after "and", replace "withstand" by -- withstands --;

Column 5,
Line 62, after "layer", replace "5" by -- 8 --;
Line 64, after "structure", replace "S" by -- 5 --;

Column 6,
Line 39, after "layer", replace "91" by -- 9 --;
Line 51, after "As", replace "Fan" by -- an --.

Signed and Sealed this

Twentieth Day of July, 2004

JON W. DUDAS
*Acting Director of the United States Patent and Trademark Office*